United States Patent
Lee et al.

(10) Patent No.: US 10,627,792 B2
(45) Date of Patent: Apr. 21, 2020

(54) CLIENT AND SERVER IN SUPERVISORY CONTROL AND DATA ACQUISITION SYSTEM

(71) Applicant: LSIS CO., LTD., Anyang-si, Gyeonggi-do (KR)

(72) Inventors: Seok Chan Lee, Anyang-si (KR); Soon Jong Bahng, Anyang-si (KR); Seung Ju Lee, Anyang-si (KR); Sung Ho Kim, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 275 days.

(21) Appl. No.: 15/404,153

(22) Filed: Jan. 11, 2017

(65) Prior Publication Data

US 2017/0205788 A1    Jul. 20, 2017

(30) Foreign Application Priority Data

Jan. 15, 2016    (KR) .................. 10-2016-0005628

(51) Int. Cl.
| | | |
|---|---|---|
| G05B 19/042 | (2006.01) | |
| H04L 29/06 | (2006.01) | |
| G06F 16/903 | (2019.01) | |

(52) U.S. Cl.
CPC ....... G05B 19/042 (2013.01); G05B 19/0428 (2013.01); H04L 67/42 (2013.01);
(Continued)

(58) Field of Classification Search
CPC ... G05B 19/0428; G06F 9/5005; H04L 67/42; H04L 67/36
See application file for complete search history.

(56) References Cited

U.S. PATENT DOCUMENTS 5,988,847 A * 11/1999 McLaughlin ...... G05B 19/4185
                                                                700/10
6,219,054 B1    4/2001 Komoda et al.
(Continued)

FOREIGN PATENT DOCUMENTS

| CN | 1154899 C | 6/2004 |
|---|---|---|
| CN | 102237719 A | 11/2011 |

(Continued)

OTHER PUBLICATIONS

European Patent Office Application Serial No. 16193360.1, Search Report dated May 29, 2017, 7 pages.
(Continued)

*Primary Examiner* — Nam T Tran
(74) *Attorney, Agent, or Firm* — K&L Gates LLP (57) ABSTRACT

The present disclosure provides a server device in a supervisory control and data acquisition system, wherein the system includes multiples client devices and the server device, wherein the server device comprises: a communication module to communicate with the multiple client devices; and a data service module configured: when a first client device has registered a requirement for processing data, to allocate a task for processing the data based on the requirement; and/or when a second client device subscribes to the requirement, to control the communication module to publish the requirement to the second client device; to process the data using the task; and to control the communication module to send the processed data to the first and/or second devices.

15 Claims, 7 Drawing Sheets

(52) U.S. Cl.
CPC .............. *G05B 2219/24215* (2013.01); *G05B 2219/25339* (2013.01); *G05B 2219/32404* (2013.01); *G05B 2219/33148* (2013.01); *G06F 16/903* (2019.01)

(56) References Cited

U.S. PATENT DOCUMENTS

| | | | |
|---|---|---|---|
| 6,571,140 | B1 | 5/2003 | Wewalaarachchi et al. |
| 2009/0006540 | A1 | 1/2009 | Liu et al. |
| 2009/0307457 | A1 | 12/2009 | Pafumi et al. |

FOREIGN PATENT DOCUMENTS

| | | |
|---|---|---|
| CN | 105187771 A | 12/2015 |
| EP | 2592517 | 5/2013 |
| EP | 3193222 A1 | 7/2017 |
| JP | 2006-246010 | 9/2006 |
| JP | 2011164755 | 8/2011 |
| KR | 20030075808 | 9/2003 |
| KR | 2013-0058398 | 6/2013 |
| KR | 101312035 | 9/2013 |
| KR | 101538701 | 7/2015 |

OTHER PUBLICATIONS

Chinese Office Action for related Chinese Application No. 201710011378.5; action dated Sep. 4, 2019; (8 pages).

\* cited by examiner

CLIENT AND SERVER IN SUPERVISORY CONTROL AND DATA ACQUISITION SYSTEM

CROSS-REFERENCE TO RELATED APPLICATION

Pursuant to 35 U.S.C. § 119(a), this application claims the benefit of earlier filing date and right of priority to Korea Patent Application No. 10-2016-0005628, filed on Jan. 15, 2016, the contents of which are all hereby incorporated by reference herein in its entirety.

BACKGROUND

The present disclosure relates to a client and a server in a supervisory control and data acquisition system, and, more particularly, to a client and a server in a supervisory control and data acquisition system where a screen specification of an executed screen is registered in the server to prevent overlapping processing for identical requests from multiple clients to reduce a load of the server, and, further, to optimize data processing of the server in a response to the client request based on the registered screen specification.

A conventional supervisory control and data acquisition (SCADA) system may monitor and control a remote equipment in a centralized manner. For this, in the SCADA system, a server and a client may communicate collected data with each other and then based on the collected data, the remote equipment may be controlled.

Specifically, in the SCADA system, the sever may acquire data from the remote equipment and then store the data in a real-time database (RTDB). The client may request the server of data to be displayed on a supervisory screen, and then, in a response to the request, the server may retrieve the requested data from the real-time database and fetch the data therefrom and then send the same to the client. The client may display the data from the server on the supervisory screen, and may supervise the remote equipment.

Figure 1:
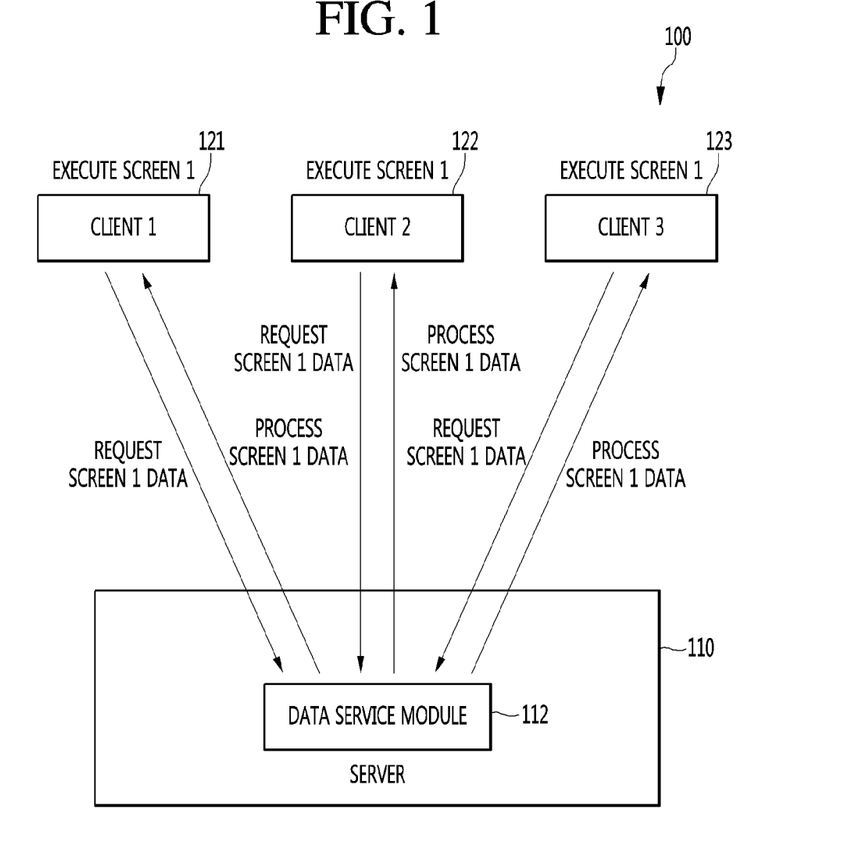
FIG. 1 shows a view for illustrating a communication between a client and a server in the conventional SCADA system.

FIG. 1 shows a view for illustrating a communication between a client and a server in the conventional SCADA system.

The SCADA system 100 may include a server 110 to receive and process a data request from clients 121, 122, and 123, and the clients 121, 122, and 123 to send the data request to the server 110 and, in a response to the receipt, to display the data on a supervisory screen thereof.

In the SCADA system 100, for a command and data service between the server 110 and clients 121, 122, and 123, a data service module 112 may be used. To be specific, when the clients 121, 122, and 123 execute screens, the clients 121, 122, and 123 may request the data service module 112 of the server 110 data to be displayed on the executed screen. In response to the data request, the data service module 112 may look into the real-time database (RTDB) (not shown) and fetch the searched data and process the fetched data into request-satisfying data to be sent to the clients 121, 122, and 123. In this connection, the clients 121, 122, and 123 may display the received data on the screen. Further, the clients 121, 122, and 123 may send commands such as value setting, tag setting, etc. via the data service module 112 to the server 110 of the SCADA system 100 or an on-field equipment in a power station, etc.

The server 110 may individually process data requests from each of the multiple clients 121, 122, and 123. In this connection, when the clients 121, 122, and 123 may execute the screen, the clients may request the server 110 data to be displayed on the executed screen one time or periodically. Further, there may be a plurality of clients 121, 122, and 123. If the N number of the clients 121, 122, and 123 execute the same screen, the server 110 may process the N numbers of the identical data requests individually and then send the N times-individually processed data to each of the clients 121, 122, and 123.

As shown in FIG. 1, when all of the client 1 121, client 2 122 and client 3 123 execute the same "screen 1", each of the clients 121, 122, and 123 may request the data service module 112 of the server 110 "data of the screen 1". Then, the data service module 112 may individually process "data of the screen 1" requested from the clients 121, 122, and 123 and send the individually-processed data to each of the client 121, 122, and 123. This procedure may be repeated periodically.

Figure 2:
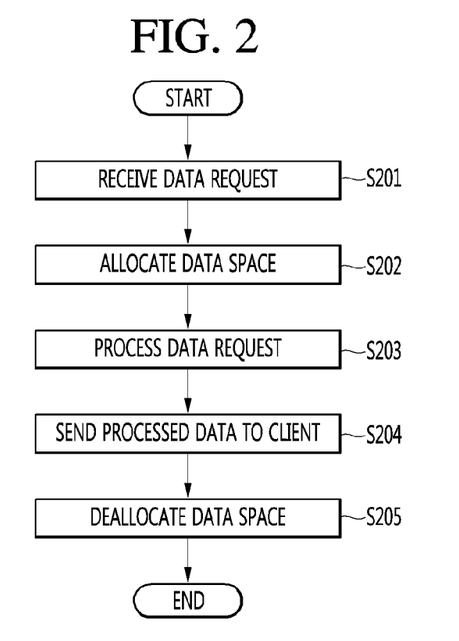
FIG. 2 shows a flow chart of a method of a server processing a data request from a client in the conventional SCADA system.

FIG. 2 shows a flow chart of a method of a server processing a data request from a client in the conventional SCADA system.

The server 110 may receive a data request S201.

In this connection, the data request may be about data to be displayed on the executed screen executed by each client 121, 122, and 123. The server 110 may receive the data request from each client 121, 122, and 123.

The server 110 may allocate a data space S202.

To be specific, the server 110 may secure a memory space for data processing in order to process the data request from each client 121, 122, and 123 and may dynamically allocate the secured memory space for the data processing.

The server 110 may process the data request S203. To this end, the server 110 may look into the real-time database and fetch associated data and write or read the fetched data into or from the memory space to form data to be sent to each client 121, 122, and 123.

Thereafter, the server 110 may send a data processing result to each client 121, 122, and 123 S204.

Upon completion of sending of the data processing result, the server 110 may de-allocate the data space S205. In this connection, the de-allocated memory space may be allocated for another task.

This procedure may be repeated periodically and per a request from each client 121, 122, and 123.

Currently, the server may repeat the identical processing N times for the N number of the identical requests in processing the data request from the client. Further, the client may typically execute the data requests periodically. Thus, the sever may perform N times dynamic allocations of the processing space, N times data processing, and N times de-allocations of the allocated processing space for the N number of the identical data requests for a single period, and, then, repeat N times dynamic allocations of the processing space, N times data processing, and N times de-allocations of the allocated processing space for the N number of the identical data requests for a next single period.

Thus, the server may have increased load for the data processing, and increased load for the dynamic allocation and deallocation of the processing space and thus increased cost thereof.

SUMMARY

The present disclosure is to provide a client and a server in a supervisory control and data acquisition system where a screen specification of an executed screen is registered in the server to prevent overlapping processing for identical requests from multiple clients to reduce a load of the server, and, further, to optimize data processing of the server in response to the client request based on the registered screen specification.

In one aspect, the present disclosure provides a client device in a supervisory control and data acquisition system, wherein the system includes the client device and a server device, wherein the client device comprising: a communication unit to communicate with the server device; a display unit to display a supervisory screen based on data; and a controller configured: to determine whether a requirement for processing the data is registered on the server device; upon determination that the requirement is not registered on the server device, to control the communication unit to register the requirement on the server device; or upon determination that the requirement is registered on the server device, to control the communication unit to subscribe to the requirement; to control the communication unit to receive the data processed by the server device in response to the registration or subscription of the requirement; and to control the display unit to display the supervisory screen based on the data.

In one implementation, the requirement includes a list, sequence, size, type, update period, and/or hierarchy of the data.

In one implementation, the controller is further configured: when the supervisory screen is terminated or the requirement is deregistered, to control the communication unit to send a signal to the server device to indicate that the supervisory screen is terminated or the requirement is deregistered.

In one aspect, the present disclosure provides a server device in a supervisory control and data acquisition system, wherein the system includes multiples client devices and the server device, wherein the server device comprises: a communication module to communicate with the multiple client devices; and a data service module configured: when a first client device has registered a requirement for processing data, to allocate a task for processing the data based on the requirement; and/or when a second client device subscribes to the requirement, to control the communication module to publish the requirement to the second client device; to process the data using the task; and to control the communication module to send the processed data to the first and/or second devices.

In one implementation, the data service module is further configured: when the supervisory screen is terminated or the requirement is deregistered, to terminate the task.

In one implementation, the server device further comprises a memory to or from which the data is written or read, wherein the data service module is further configured: when the first client device has registered the requirement, to allocate a space for the data processing to the memory based on the requirement.

In one implementation, the data service module is further configured: when the supervisory screen is terminated or the requirement is deregistered, to deallocate the allocated space from the memory.

In one implementation, the data service module is further configured: to control the communication module to fetch the data from a real-time database per the update period of the data; to process the fetched data; and to control the communication module to send the processed data to the first and/or second client devices.

In one aspect, the present disclosure provides a method of operating a server device in a supervisory control and data acquisition system, wherein the system includes multiples client devices and the server device, wherein the method comprises: the server device communicating with the multiple client devices and/or a real-time database; when a first client device has registered a requirement for processing data, the server device allocating a task for processing the data based on the requirement; and/or when a second client device subscribes to the requirement, the server device publishing the requirement to the second client device; the server device processing the data using the task; and the server device sending the processed data to the first and/or second devices.

Using the present disclosure, by registering and/or subscribing to the screen specification, the sever device suffices to perform a single-time data processing for the identical data requests from the multiple client devices respectively per a single data processing period, to reduce the load of the data processing of the server device.

Further, the space may be allocated based on the data size defined in the screen specification, and, then, the space may be kept until the screen specification is deregistered, thereby to reduce cost for the dynamic allocation/deallocation.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTIONS

Examples of various embodiments are illustrated in the accompanying drawings and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

Hereinafter, embodiments of the present disclosure will be described in details with reference to attached drawings.

Figure 3:
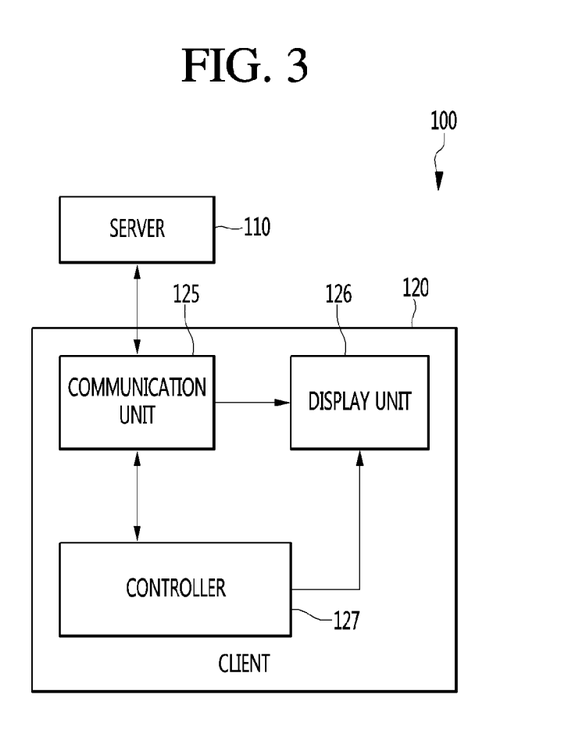
FIG. 3 shows a block diagram of a configuration of a client in a supervisory control and data acquisition system in accordance with one embodiment of the present disclosure.

FIG. 3 shows a block diagram of a configuration of a client in a supervisory control and data acquisition system in accordance with one embodiment of the present disclosure.

The supervisory control and data acquisition (SCADA) system may supervise and control a RTU (Remote Terminal Unit) in a centralized manner. For this, the SCADA system may collect and display status data of the RTU from the RTU using an analogue or digital data via a communication channel.

The SCADA system 100 may include a server 110 and a client 120 and multiple RTUs (not shown).

The server 110 may collect status data of the RTU such as an on-field equipment periodically. In response to a data request from the client 120, the sever 110 may send the collected data to the client 120. In this connection, the collected data of the RTU may be displayed on the supervisory screen of the client 120 such as a supervisory panel or an electric system panel. A supervisor may monitor the RTU on the supervisory screen.

Hereinafter, the client 120 will be described with reference to FIG. 3. The server 110 will be later described with reference to FIG. 4.

The client 120 in the supervisory control and data acquisition system 100 in accordance with one embodiment of the present disclosure may include a communication unit 125 and display unit 126 and controller 127.

The communication unit 125 may communicate with the server 110.

To be specific, the communication unit 125 may communicate with the server 110 via a variety of wired or wireless communications including a mobile communication, data communication, wireless LAN communication, local area communication, optical communication, power line communication, etc. To this end, the communication unit 125 may include communication modules to support the variety of wired or wireless communications.

The communication unit 125 may request the server of the data to be displayed on the supervisory screen. In response to the receipt, the server 110 may send the requested data to the communication unit 125.

The requested data may include, but not limited to, voltage or current measurements based on phases thereof, active power or reactive power measurements, TAP positions, temperatures, and/or other input values. These data may be real-time data and thus may be updated periodically.

The display unit 126 may have a supervisory screen on which the requested data is displayed.

The supervisory screen may be about monitoring the status of the RTU. In this connection, the RTU may refer to the on-site equipment such as a breaker or relay. The supervisory screen may be embodied as a HMI (Human Machine Interface), and thus, may receive a user input for controlling the RTU or settings of the supervisory screen.

When the supervisory screen is executed, the data received by the communication unit 125 from the server 110 may be displayed on the supervisory screen of the display unit 126.

The controller 127 may be configured to determine whether requirements for data processing are registered onto the server 110, and upon determination that the requirements for data processing are not registered onto the server 110, to control the communication unit 125 to register the requirements onto the server 110, or upon determination that the requirements for data processing are registered onto the server 110, to control the communication unit 125 to subscribe to the requirements.

In this connection, the requirements for data processing, that is, a screen specification may include a data list, a data sequence, a data size, a data type, a data update period and/or a data hierarchy.

Hereinafter, in the present disclosure, the requirements for data processing refers to the screen specification.

Using the present disclosure, the controller 127 may be configured to determine whether the screen specification is registered onto the server 110 and to register or subscribe to the screen specification based on the determination results. In case the controller 127 registers the screen specification, another subsequent client requesting the same screen specification may subscribe to the screen specification registered by the controller 127. In case the controller 127 subscribes the screen specification, the controller 127 may subscribe to the screen specification previously registered by another client. In this connection, the server 110 may suffice to perform a single-time data processing and space allocation for the same screen specification. This will be described later with reference to FIG. 4.

The controller 127 may control the communication unit 125 to receive data processed by the server 110 in a response to the registration or subscription of the requirements for data processing.

When the client receives the requested data from the server 110, the controller 127 may display the supervisory screen on the display unit 126 based on the received data.

Further, when the supervisory screen is terminated or the requirements is deregistered, the controller 127 may control the communication unit 125 to send a signal to the server 110 to indicate that the supervisory screen is terminated or the requirements is deregistered. When the supervisory screen is terminated or the requirements is deregistered, the client may no longer request the data corresponding to the requirements. Thus, the controller 127 may control the communication unit 125 to send a signal to the server 110 to indicate that the supervisory screen is terminated or the requirements is deregistered, in order for the server to deallocate the allocated memory space or to terminate the CPU for the data processing.

Figure 4:
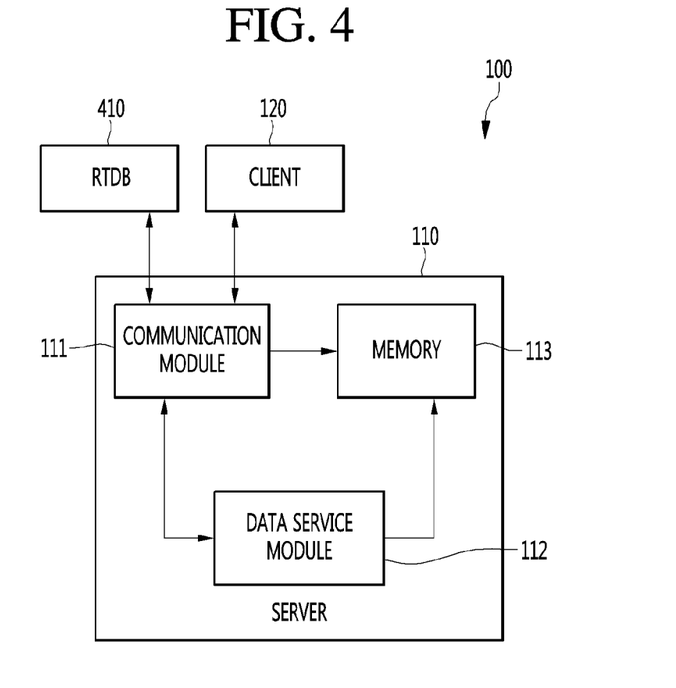
FIG. 4 shows a block diagram of a configuration of a server in a supervisory control and data acquisition system in accordance with one embodiment of the present disclosure.

FIG. 4 shows a block diagram of a configuration of a server in a supervisory control and data acquisition system in accordance with one embodiment of the present disclosure.

In the SCADA system 100, the client 120 may request the server 110 data to be displayed on the executed screen periodically. Upon receipt of the request, the server 110 may fetch the related data from the real-time database 410, and then process the related data into data to be displayed on the screen of the client 120 and then send the same to the client 120.

To this end, in the present supervisory control and data acquisition system 100, the server 110 may include a communication module 111, a data service module 112, and a memory 113.

The communication module 111 may communicate with the client 120 and/or real-time database (RTDB) 410. To be specific, the communication module 111 may look into the real-time database 410 and fetch the data to be displayed on the supervisory screen or process the searched data which may be sent to the client 120.

To this end, the communication module 111 may communicate with the client 120 and real-time database 410 via a variety of wired or wireless communications including a mobile communication, data communication, wireless LAN communication, local area communication, optical communication, power line communication, etc. To this end, the communication module 111 may include modules to support a variety of wired or wireless communications.

When the client 120 has registered the requirements for data processing, the data service module 112 may allocate a task for data processing based on the requirements.

In this connection, the requirements for data processing may include at least one of a data list, a data sequence, a data size, a data type, a data update period and/or a data hierarchy.

The task may refer to a thread or worker. The thread may refer to a work unit of an operating system or a program.

For example, when client 120 has registered the requirements for data processing, the data service module 112 may generate a thread to process the data and allocate the generated thread onto the CPU. The generated thread may be kept until the requirements is deregistered.

When client 120 has subscribed to the requirements for data processing, the data service module 112 may publish the requirements to the associated client 120. In this connection, the server 110 may act as a publisher, while the client 120 may act as a subscriber. Thus, the communication between the client 120 and the server 110 may be done in a publish-subscribe form. To be specific, the publisher may add a service to the target data, and may send the data to a registered subscriber onto the service. In this connection, the service may refer to ID (Identification) information for the subscriber. The subscriber may register the ID, and may receive data sent to the ID. All of subscribers registering the ID may receive the data from the server/publisher 110.

Further, after the data service module 112 has processed the data using the task allocated for the data processing, the data service module 112 may send the processed data to a client 120 registering the requirements and/or a client 120 subscribing to the requirements.

When the client 120 has terminated the supervisory screen or the requirements have been deregistered, the data service module 112 may terminate the task for the data processing. Since there is no longer a request of the data corresponding to the requirements, the task for the data processing is not required.

When the client 120 has registered the requirements for data processing, the data service module 112 may allocate the space for the data processing in the memory 113 based on the requirements.

The space for the data processing may be allocated onto a predetermined region of a Random Access Memory (RAM). For example, when the client 120 has registered the requirements for data processing, the data service module 112 may allocate the predetermined region of the Random Access Memory (RAM) as the space for the data processing. The allocated data processing space may be kept until the requirements are deregistered.

Thereafter, when the client 120 has terminated the supervisory screen or deregistered the requirements, the data service module 112 may deallocate the allocated data processing space.

The data displayed on the supervisory screen should be updated in real time. To this end, the client 120 may request the server 110 data to be displayed on the executed supervisory screen periodically. In this connection, the server 110 may process necessary data in response to the request from the client 120, and send the processed data to the client 120. To this end, the data service module 112 may communicate data with the real-time database 410 per a data update period, and process the data from the real-time database 410 and then control the communication module 111 to send the processed data to the client 120.

The memory 113 may read or write data. The memory 113 may refer to a main memory to or from which data is written or read in a predetermined period regardless of a data storage location. In one example, the memory 113 may be embodied as a Random Access Memory (RAM).

In the conventional supervisory control and data acquisition system 100, communications between the server 110 and client 120 may be based on a request-reply structure. That is, when the client 120 requests the server 110 data, the server 110 may process and send the data and to the client 120.

Thus, only when there is the request from the client 120, the data will be sent to the client 120. Further, the server 110 may individually process a data request from each of the multiple clients 120. Thus, when each of the multiple clients 120 requests the same data, the server 110 will individually process the number of the same data corresponding to the number of the clients 120.

However, using the present disclosure, the client 120 has defined the screen specification required to execute the screen and has registered the defined screen specification onto the server 110; then, the server 110 has processed a single-time data processing for the same screen execution based on the registered screen specification. Thus, the server 110 may have reduced load of the data processing.

Furthermore, using the present disclosure, when the screen specification has been registered, the server 110 may allocate the task and memory space for the data processing; or when the screen specification has been deregistered, the server 110 may terminate the task and deallocate the memory space for the data processing. In this way, only when the screen specification is registered, the allocated task and memory space may be maintained. In this connection, the repetitions of the dynamic allocation of the processing space and the deallocation thereof per a client data request or a period may be avoided.

In this way, in the supervisory control and data acquisition system 100 having the request-reply communication structure, the data processing by the server 110 in response to the request from the client 120 may be optimized.

Figure 5:
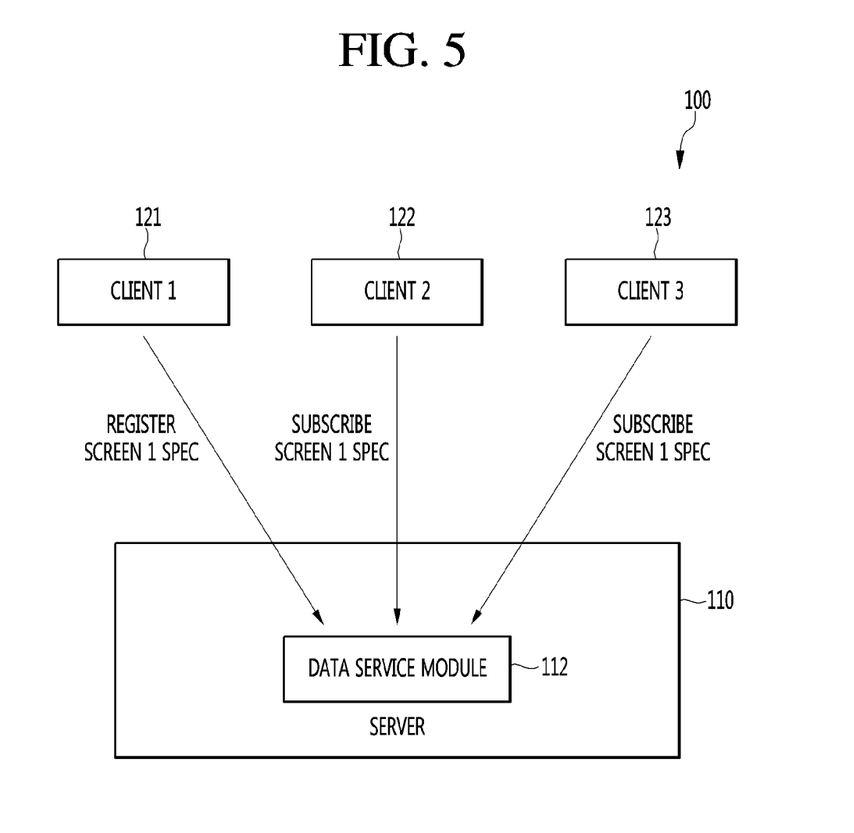
FIG. 5 shows a view for illustrating a communication method between a client and a server in a supervisory control and data acquisition system in accordance with one embodiment of the present disclosure.

FIG. 5 shows a view for illustrating a communication method between a client and a server in a supervisory control and data acquisition system in accordance with one embodiment of the present disclosure.

The server 110 may refer to a server in a 2 tiers-structured client-to-server communication model or may refer to a broker in a 3 tiers-structured client-to-server communication model.

When the screen specification for the executed screen is not registered on the server 110, each of the clients 121, 122, and 123 may define the screen specification for the executed screen and then may register the same on the server 110. As used herein, the screen specification may include a data list, a data sequence, etc. to be displayed on the screen. A list of the screen specifications registered on the server may be read by another client 121, 122, and 123.

When the screen specification for the executed screen is registered on the server 110, each of the clients 121, 122, and 123 may subscribe to the screen specification and receive data corresponding to the screen specification.

As shown in FIG. 5, when a screen specification for a screen 1 is not present in the server 110 upon the client 1 121 executing the screen 1, the client 121 may define the screen specification for the screen 1 and register the defined specification on the server 110. Subsequently, when a client 2 122 executes the screen 1, the client 2 may subscribe to the screen specification for the screen 1 already registered on the server 110 without defining and/or registering the screen specification for the screen 1, in order for the client 2 to request related data. Similarly, when a client 3 123 executes the screen 1, the client 3 may subscribe to the screen specification for the screen 1 already registered on the server 110 without defining and/or registering the screen specification for the screen 1, in order for the client 3 to request related data.

Figure 6:
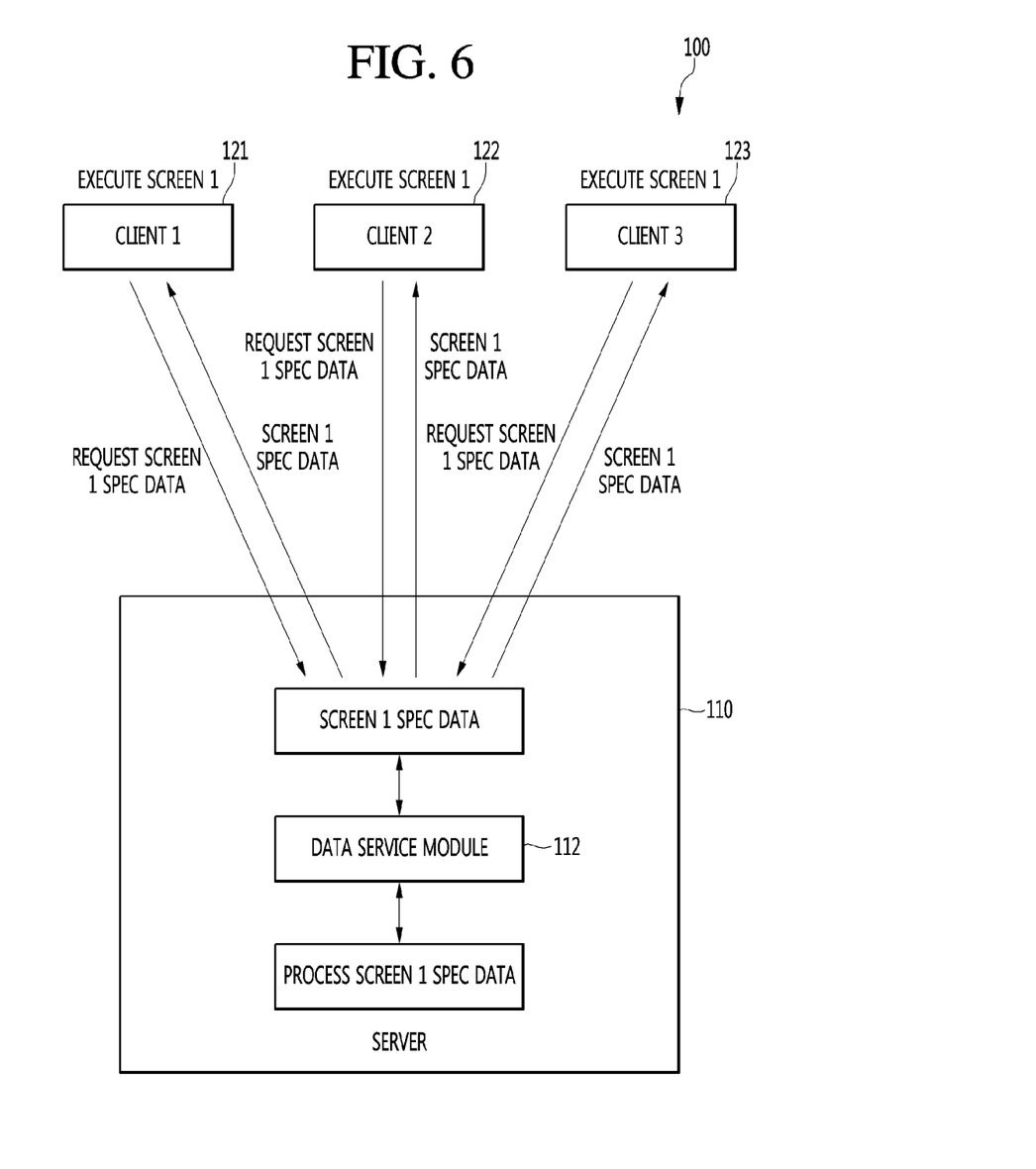
FIG. 6 shows a view for illustrating a communication method between a client and a server in a supervisory control and data acquisition system in accordance with one embodiment of the present disclosure.

FIG. 6 shows a view for illustrating a communication method between a client and a server in a supervisory control and data acquisition system in accordance with one embodiment of the present disclosure.

In order to process data, a memory space for the data processing is required, and, a CPU for the data processing should be allocated. To this end, the server 110 may generate a thread for a registered screen specification, and allocate a data space as needed. In this connection, the thread may intend to process a logic defined in a processor, and the data space may refer to a memory to store data for processing the logic in the processor.

The server 110 may process data based on the request from the client 121, 122, and 123 or a period defined in screen specification and then may send the processed data to each of client 121, 122, and 123 registering or/and subscribing to the screen specification.

In this connection, a way of data transmission by the server 110 may include an entire data transmission and only-changed data transmission.

In FIG. 6, all of the client 1 121, client 2 122 and client 3 123 may execute the same screen 1. In this connection, each of the clients 121, 122, and 123 may request the server 110 of data corresponding to the specification of the screen 1. In FIG. 6, it may be assumed that the specification of the screen 1 is registered on the server 110 as described with reference to FIG. 5.

The data service module 112 of the server 110 may receive requests of plural data commonly corresponding to the specification of the screen 1 from the client 1 121, client 2 122 and client 3 123 respectively. In this connection, the data service module 112 may perform a single-time processing of the data corresponding to the specification of the screen 1 based on the registered specification of the screen 1. Thereafter, the server 110 may send the processed data corresponding to the specification of the screen 1 to each of the clients 121, 122, and 123.

In this way, when the multiple clients 121, 122, and 123 execute the identical executed screens respectively, the server 110 may generate a thread to perform a single-time processing of the requested data for the executed screen, and then may send the processed data to the clients 121, 122, and 123 registering the screen specification of the executed screen.

Figure 7:
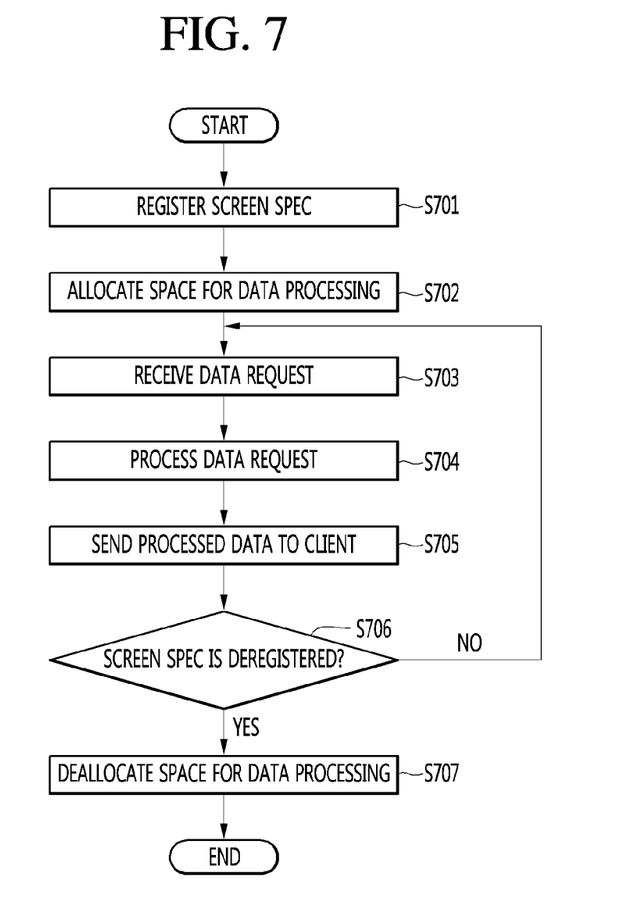
FIG. 7 shows a flow chart for illustrating a communication method between a client and a server in a supervisory control and data acquisition system in accordance with one embodiment of the present disclosure.

FIG. 7 shows a flow chart for illustrating a communication method between a client and a server in a supervisory control and data acquisition system in accordance with one embodiment of the present disclosure.

The server 110 may process the requested data from the client 120 as follows:

At the operation S701, the client 120 may register the screen specification of the executed screen on the server 110.

When the screen specification has registered, the server 110 may allocate a task for the data processing corresponding to the screen specification. To be specific, the server 110 may allocate a thread for the data processing corresponding to the screen specification.

At the operation S702, the server 110 may allocate the data processing space.

In this connection, the server 110 may allocate a data processing space to the task based on a data size defined in the screen specification.

At the operation S703, the server 110 may receive the data request from the client 120.

At the operation S704, the server 110 may process the data request.

At the operation S705, the server 110 may send the processed data to the client 120.

At the operation S706, the server 110 may determine whether the screen specification is deregistered.

When the client 120 terminates the executed screen whose screen specification is registered or when a screen specification deregistration or de-subscription command is issued on a screen specification-related screen, the screen specification is deregistered or de-subscribed. When the screen specification is deregistered or de-subscribed, there is no client 120 requesting the data corresponding to the screen specification. Thus, the server 110 may deallocate the data space and may terminate the thread.

Unless the screen specification is deregistered or de-subscribed, the server 110 may fetch the data corresponding to the screen specification from the real-time database 410 periodically and may send the data to the client 120.

Thus, when it is determined that the screen specification is deregistered or de-subscribed at the operation S706 (Yes), the server 110 may deallocate the data processing space. Otherwise, when it is determined that the screen specification is not deregistered or de-subscribed at the operation S706 (No), the server 110 may return to the operation S703 where the server 110 may process the data according to a period defined in the screen specification, and then send the processed data to the client 120 registering and subscribing to the screen specification.

In this way, the data size allocated based on the screen specification may be continuously used to reduce cost for the dynamic allocation/deallocation.

The above description is not to be taken in a limiting sense, but is made merely for the purpose of describing the general principles of exemplary embodiments, and many additional embodiments of this disclosure are possible. It is understood that no limitation of the scope of the disclosure is thereby intended. The scope of the disclosure should be determined with reference to the Claims. Reference throughout this specification to "one embodiment," "an embodiment," or similar language means that a particular feature, structure, or characteristic that is described in connection with the embodiment is included in at least one embodiment of the present disclosure. Thus, appearances of the phrases "In one implementation," "in an embodiment," and similar language throughout this specification may, but do not necessarily, all refer to the same embodiment.

What is claimed is:

1. A client for a supervisory control and data acquisition system, the client comprising:
   a communication unit, wherein a communication circuit communicates with a server;
   a display unit to display a supervisory screen based on data corresponding to a first screen specification; and
   a controller configured to:
   determine, via a processor, whether a second screen specification identical to the first screen specification is registered on the server by reading a list of screen specifications from the server;
   when the second screen specification identical to the first screen specification is not registered on the server device, control the communication unit to register the second screen specification on the server;
   when the second screen specification identical to the first screen specification is registered on the server device, control the communication unit to subscribe to the second screen specification;
   control, via the processor, the communication unit to receive the data processed by the server in response to the registration or subscription of the second screen specification; and
   control, via the processor, the display unit to display the supervisory screen based on the received data,
   wherein each of the first screen specification and the second screen specification is a requirement for data processing corresponding to the data and includes an update period of the data,
   wherein the controller is further configured to determine, via the processor, that the first screen specification is not identical to the second screen specification if the update period of the first screen specification is not identical to the update period of the second screen specification, and
   wherein the received data is data processed for only a single time by the server in accordance with the registered second screen specification.

2. The client of claim 1, wherein each of the first screen specification and the second screen specification further includes at least one of a list, sequence, size, type, or hierarchy of the data.

3. The client of claim 1, wherein the controller is further configured to:
   when the supervisory screen is terminated or the second screen specification is deregistered, control the communication unit to send a signal to the server to indicate that the supervisory screen is terminated or the second screen specification is deregistered.

4. A server in a supervisory control and data acquisition system, the server comprising:
   a communication module, wherein a communication circuit communicates with at least one client and a real time database; and
   a data service module configured to:
   control, via a processor, the communication module to receive a request of data corresponding to a first screen specification from a first client;
   read, via the processor, a list of screen specifications registered in the server to determine whether a second screen specification identical to the first screen specification is registered on the server;
   when the second screen specification identical to the first screen specification is not registered on the server, register, via the processor, the second screen specification identical to the first screen specification and allocate a task for processing the data in accordance with the second screen specification;
   when the second screen specification identical to the first screen specification is registered on the server, control, via the processor, the communication module to publish the second screen specification to the first client;
   when the task has not proceeded, process, via the processor, the data for only a single time using the task; and
   control, via the processor, the communication module to send the processed data to the first client,
   wherein each of the first screen specification and the second screen specification is a requirement for data processing corresponding to the data and includes an update period of the data, and
   wherein the data service module is further configured to determine, via the processor, that the first screen specification is not identical to the second screen specification if the update period of the first screen specification is not identical to the update period of the second screen specification.

5. The server of claim 4, wherein the data service module is further configured to:
   when the supervisory screen of the first client is terminated or the second screen specification is deregistered, terminate the task.

6. The server of claim 4, further comprising a memory to or from which the data is written or read, wherein the data service module is further configured to:
when registering the second screen specification, allocate a space for the data processing to the memory based on the second screen specification.

7. The server of claim 6, wherein the data service module is further configured to:
when a supervisory screen of the first client is terminated or the second screen specification is deregistered, deallocate the allocated space from the memory.

8. The server of claim 4, wherein each of the first screen specification and the second screen specification further includes at least one of a list, sequence, size, type, or hierarchy of the data.

9. The server of claim 8, wherein the data service module is further configured to:
control, via the processor, the communication module to fetch the data from a real-time database per the update period of the data;
process, via the processor, the fetched data; and
control, via the processor, the communication module to send the processed data to at least one client.

10. A method of operating a server in a supervisory control and data acquisition system, wherein the system includes at least one client and the server, the method comprising:
receiving a request of data corresponding to a first screen specification from a first client;
reading a list of screen specifications registered in the server to determine whether a second screen specification identical to the first screen specification is registered on the server;
when the second screen specification identical to the first screen specification is not registered on the server, registering the second screen specification identical to the first screen specification and allocating a task for processing the data in accordance with the second screen specification;
when the second screen specification identical to the first screen specification is registered on the server, publishing the second screen specification to the first client;
when the task has not proceeded, processing the data for only a single time using the task; and
sending the processed data to the first client,
wherein each of the first screen specification and the second screen specification is a requirement for data processing corresponding to the data and includes an update period of the data, and
wherein the method further comprises determining that the first screen specification is not identical to the second screen specification if the update period of the first screen specification is not identical to the update period of the second screen specification.

11. The method of claim 10, further comprising:
when a supervisory screen of the first client is terminated or the second screen specification is deregistered, terminating the task.

12. The method of claim 10, wherein the server further comprises a memory to or from which the data is written or read, wherein the method further comprises:
when registering the second screen specification, allocating a space for the data processing to the memory based on the second screen specification.

13. The method of claim 12, further comprising:
when a supervisory screen of the first client is terminated or the second screen specification is deregistered, deallocating the allocated space from the memory.

14. The method of claim 10, wherein each of the first screen specification and the second screen specification includes at least one of a list, sequence, size, type, or hierarchy of the data.

15. The method of claim 14, further comprising:
fetching the data from a real-time database per the update period of the data;
processing the fetched data; and
sending the processed data to at least one client.

* * * * *